Patented Sept. 1, 1931

1,821,019

UNITED STATES PATENT OFFICE

MAX KUGEL, OF LEVERKUSEN-ON-THE-RHINE, GERMANY, ASSIGNOR TO GENERAL ANILINE WORKS, INC., OF NEW YORK, N. Y., A CORPORATION OF DELAWARE

ANTHRAQUINONE DYESTUFFS

No Drawing. Application filed February 26, 1929, Serial No. 342,947, and in Germany February 29, 1928.

The present invention relates to the manufacture of wool dyestuffs of the anthraquinone series and to the new products obtainable thereby, more particularly it relates to compounds of the general formula:

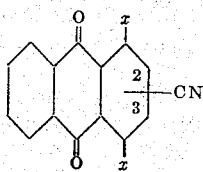

wherein one $x$ stands for hydrogen, the amino, an alkylamino, or a sulfonated arylamino, the other $x$ stands for a sulfonated arylamino group, and wherein the cyanogen group stands in one of the positions 2 and 3.

My new compounds are obtainable for example by boiling in a basic reacting organic solvent, preferably one having a high boiling point, for example in quinoline, benzylcyanide and the like, an anthraquinone compound of the general formula:

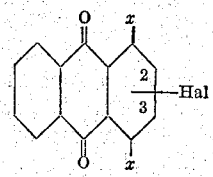

wherein one $x$ stands for hydrogen, the amino, an alkylamino or an arylamino group, the other $x$ stands for an arylamino group, and Hal stands for a halogen atom in 2 or 3 position, with cuprous cyanide. If a low boiling basic reacting organic solvent, such as pyridine, is used, the reaction must be carried out under super-atmospheric pressure, for instance in an autoclave at a temperature of about 180° C. On cooling, the new cyanogen derivatives separate in a crystalline form. They are distinguished by a considerably deeper color compared with that of the starting material.

The new cyanogen anthraquinone derivatives can be transformed into the corresponding aryl-sulfonic acids by treating them with a sulfonating agent at a low temperature, say not above 20° C. The sulfonation may be performed, for example, by dissolving the cyanogen compound in concentrated sulfuric acid, adding fuming sulfuric acid thereto, for example of 20% $SO_3$, and stirring the mixture for some time, at a temperature between 10 and 15° C. The new sulfonated dyestuffs are bluish-red to green compounds. They dye wool from an acid bath powerful red to green shades. The dyeings are particularly even and beautiful in artificial light.

The herein described new dyestuffs are also obtainable by boiling a cyanogen compound of the general formula:

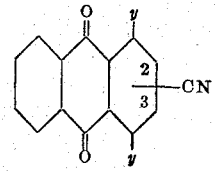

wherein one $y$ stands for a halogen atom and the other $y$ for hydrogen, halogen, the amino—an alkylamino—or an arylamino group, with a primary aromatic amine, advantageously with the addition of an acid binding agent, such as sodium acetate; this method of preparing my new dyestuffs is an equivalent of the process of introducing the cyanogen group into the 2 or 3 position of a 1-arylamino- or 1,4 di-arylamino- or 1.4-amino-arylamino- or 1.4 alkylamino-arylamino-anthraquinone.

The invention is illustrated by the following examples but is not restricted thereto:—

Example 1

7.8 parts by weight of 1-p-tolylamino-3-bromo-anthraquinone (obtainable from 1:3-dibromoanthraquinone by treatment with p-toluidine) are heated to boiling with stirring while 1.8 parts by weight of cuprous cyanide and 40 parts by weight of quinoline. The heating is continued until a test portion dissolved in pyridine, no longer shows any change in color, which is the case in about one hour. After cooling and filtering, the separated mixture of the new substance and cuprous bromide is washed with alcohol and water and made into a paste with some water. The cuprous bromide is then dissolved by the addition of concentrated hydrochloric acid and the 1-p-tolylamino-3-cyanoanthraquinone is isolated by filtering and washing. It can be crystallized from pyridine and dissolves in concentrated sulfuric acid with a yellow coloration which changes to green on the addition of formaldehyde and dissolves with bluish red coloration in pyridine. On treating the substance with a sulfonating agent, for example weak fuming sulfuric acid, a sulfonic acid compound is obtained, which dyes wool red shades, much more bluish than the dyeings of the sulfonated starting material.

Example 2

8.1 parts by weight of 1-amino-2-bromo-4-p-tolylaminoanthraquinone are heated to boiling while stirring with 1.8 parts by weight of cuprous cyanide in 40 parts by weight of quinoline until a test portion dissolved in pyridine shows no further increase of greenish shade. The reaction is complete in one half to one hour. The mixture is then allowed to cool and worked up as described in Example 1. The thus formed 1-amino-2-cyano-4-p-tolylaminoanthraquinone crystallizes from aniline in the form of small dark crystals, which dissolve is concentrated sulfuric acid with a dull green coloration and in pyridine with a greenish blue coloration. On treating the new substance dissolved in sulfuric acid monohydrate with fuming sulfuric acid, a sulfonic acid compound is obtained, which dyes wool greenish blue tints. The dyeings are distinguished by satisfactory evenness and beautiful color in artificial light.

Example 3

10 parts by weight of 1-methylamino-2-cyano-4-bromo-anthraquinone, (obtainable from 1-methylamino-2-cyanoanthraquinone by bromination), 70 parts by weight of p-toluidine and 6 parts by weight of anhydrous sodium acetate are heated to boiling while stirring until the formation of the dyestuff is complete. The progress of the reaction is controlled by dissolving a test portion in pyridine or chloroform. The strongly colored melt is then worked up with alcohol or dilute hydrochloric acid and the crude product recrystallized from a large quantity of boiling glacial acetic acid. The 1-methylamino-2-cyano-4-p-tolylaminoanthraquinone, which thus crystallizes in fine, small needles, dissolves in concentrated sulfuric acid with a greenish yellow coloration, and in pyridine with a green coloration, while 1-methylamino-2-bromo-4-p-tolylaminoanthraquinone dissolves in pyridine with a greenish blue coloration. On treating the new substance, dissolved in sulfuric acid monohydrate, with fuming sulfuric acid containing 20% $SO_3$ at about 15° C. a sulfonic acid of the formula:

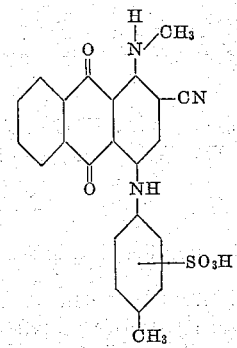

is produced, which dyes wool from an acid bath a beautiful green shade. The dyeings are distinguished by an excellent evenness and beautiful color in artificial light.

I claim:—

1. The process which comprises heating to boiling a compound of the general formula:

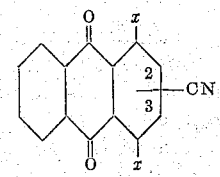

wherein one $x$ stands for hydrogen or a substituent of the group consisting of the amino, alkylamino and arylamino groups, and the other $x$ stands for a halogen atom and wherein the cyanogen group stands in one of the positions 2 and 3 with at least the equimolecular quantity of a primary aromatic amine, and treating the reaction product with a sulfonating agent at a temperature below 20° C.

2. The process which comprises heating to boiling a compound of the general formula:

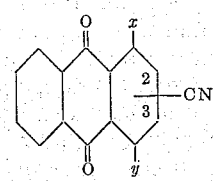

wherein $x$ stands for an alkylamino group and $y$ stands for a halogen atom, and wherein the cyanogen group stands in one of the positions 2 and 3, with at least the equimolecular quantity of a primary aromatic amine, and treating the reaction product with a sulfonating agent at a temperature below 20° C.

3. The process which comprises heating to boiling a compound of the general formula:

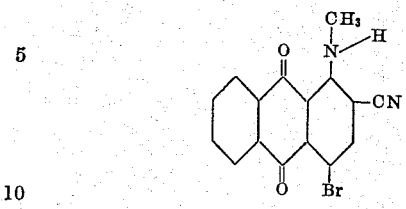

with at least the equimolecular quantity of p-toluidine, and treating the reaction product in a solution of strong sulfuric acid monohydrate with fuming sulfuric acid at about 15° C.

4. As new products the compounds of the probable general formula:

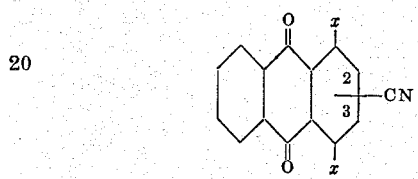

wherein one $x$ stands for hydrogen or a substituent of the group consisting of the amino-alkylamino- and sulfonated arylamino groups, and the other $x$ stands for a sulfonated arylamino group, and wherein the cyanogen group stands in one of the positions 2 and 3, said products being bluish-red to green compounds dyeing wool red to green shades of especially good evenness and beautiful color in artificial light.

5. As new products the compounds of the probable general formula:

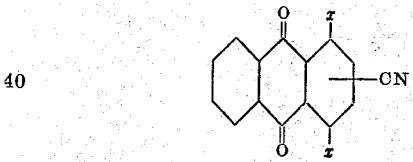

wherein one $x$ stands for an alkylamino- group and the other $x$ stands for a sulfonated arylamino group, and wherein the cyanogen group stands in one of the positions 2 and 3, said products being bluish-green to green compounds dyeing wool bluish-green to green shades of especially good evenness and beautiful color in artificial light.

6. As new products the compounds of the probable general formula:

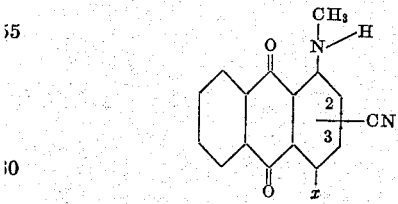

wherein $x$ stands for a sulfonated arylamino group and wherein the cyanogen group stands in one of the positions 2 and 3, said products being bluish-green to green compounds dyeing wool bluish-green to green shades of especially good evenness and beautiful color in artificial light.

7. As a new product the compound of the probable formula:

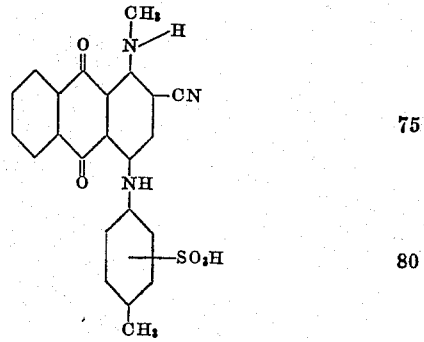

said product being a green compound dyeing wool green shades of especially good evenness and beautiful color in artificial light.

In testimony whereof I have hereunto set my hand.

MAX KUGEL. [L. S.]

CERTIFICATE OF CORRECTION.

Patent No. 1,821,019.             Granted September 1, 1931, to

MAX KUGEL.

It is hereby certified that error appears in the printed specification of the above numbered patent requiring correction as follows: Page 1, line 15, after "amino" insert group; line 89, for "with" read while, and line 90, for "while" read with; page 2, line 38, for "is" read in; and that the said Letters Patent should be read with these corrections therein that the same may conform to the record of the case in the Patent Office.

Signed and sealed this 3rd day of November, A. D. 1931.

(Seal)

M. J. Moore,
Acting Commissioner of Patents.